United States Patent Office 2,935,292
Patented May 3, 1960

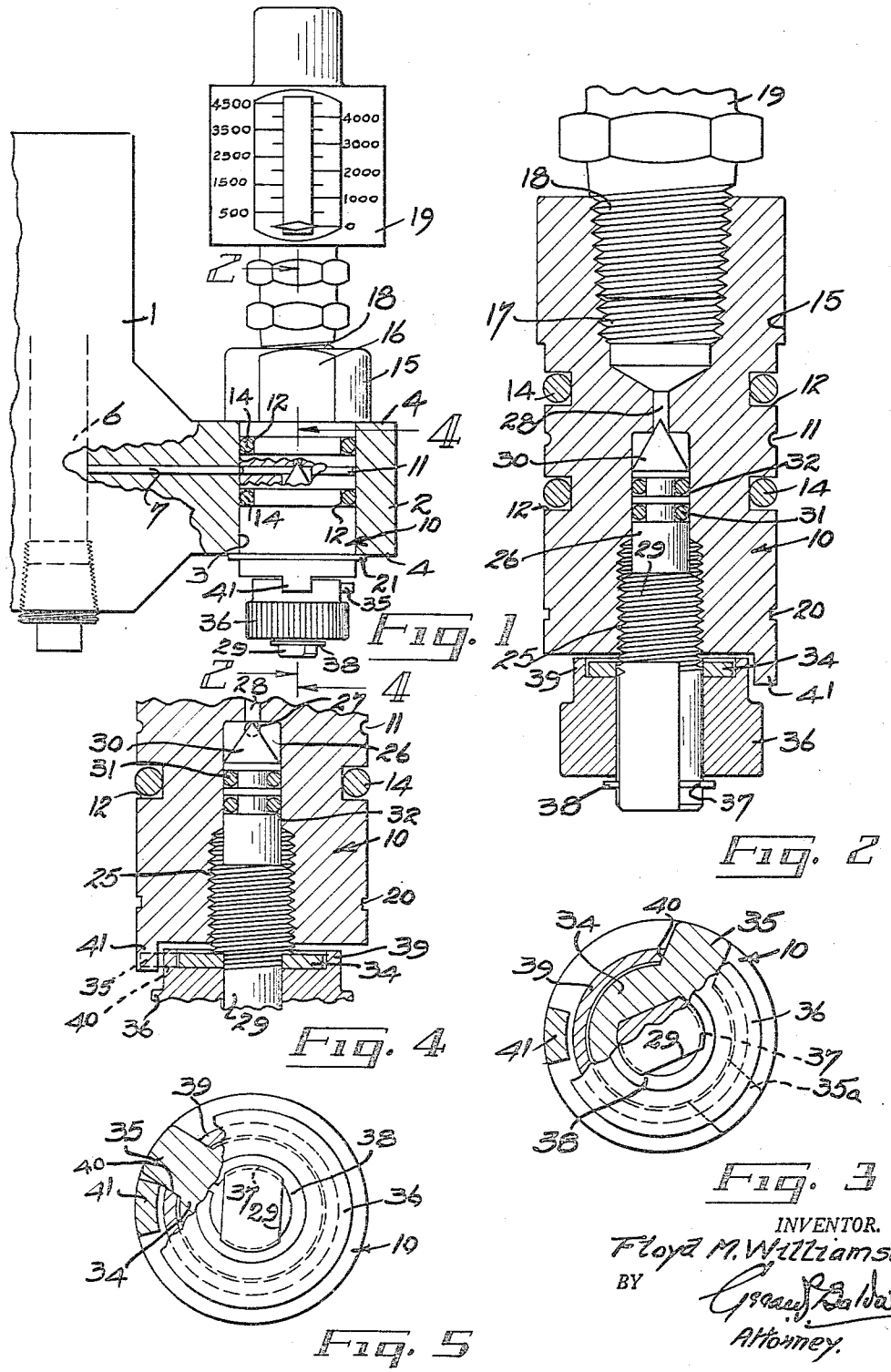

2,935,292
GAUGE RETAINERS
Floyd M. Williamson, Detroit, Mich.

Application November 7, 1957, Serial No. 695,112

1 Claim. (Cl. 251—28.5)

This invention relates to improvements in gauge retainers and refers particularly to gauge retainers for attachment to hydraulic valve bodies, fixtures and the like.

It is an object of the invention to provide a gauge retainer adapted to be rotatably mounted on a valve body or the like for supporting a gauge thereon so that it may be turned to face any direction from which it can be most easily read.

Another object of the invention is to provide a gauge retainer for mounting a gauge on a valve body or the like including quick and easy means for opening and closing a valve in the retainer so that the gauge need only be exposed to the rapid and excessive variations in pressure to which many hydraulic mechanisms are subjected during quite short intervals during which readings are being taken.

A further object of the invention is to provide such a gauge retainer including means for limiting the extent which the valve therein may be normally opened, and means for increasing the maximum permissible opening of the valve to offset any distortion thereof, or of its seat, which may result after prolonged usage.

With these and other objects and advantages in view which will become apparent as the specification proceeds, the invention is hereinafter more fully described with the aid of the accompanying drawing, in which:

Figure 1 is a view, partly in section, showing my gauge retainer mounted on a valve body and supporting a pressure gauge.

Figure 2 is an enlarged section on the line 2—2 of Figure 1 with the needle valve closed.

Figure 3 is an inverted plan view of Figure 2.

Figure 4 is an enlarged partial section on the line 4—4 of Figure 1 with the needle valve open.

Figure 5 is an inverted plan similar to that shown in Figure 3, but with the stop in the position it assumes when the needle valve is open.

Formed integral with a valve body 1, or other hydraulic fixture, is a projection 2 having an aperture 3 formed therethrough which extends between opposite and parallel sides 4 thereof. Extending through the body 1 from a chamber 6 therein through which fluid under pressure is adapted to flow is a passage 7 which terminates at its opposite extremity in the aperture 3 intermediately of the length of the latter.

A body or barrel 10 is rotatably mounted in the aperture 3 and has an annular groove 11 formed around its outer periphery intermediately of its length which is at all times in registry with the passage 7. Formed also around the barrel 10 on opposite sides of the groove 11 and vertically spaced therefrom are other grooves 12 in which O-rings 14 are provided to prevent the escape of fluid under pressure from the passage 7 or the groove 11 through either extremity of the aperture 3. The outer periphery of the upper extremity 15 of the barrel 10 is enlarged to rest upon the upper side 4 of the projection 2, and the said outer periphery is provided with opposite and parallel flat faces, one of which is shown at 16, to facilitate rotation of the barrel. Formed vertically in the barrel from its upper extremity for a portion of its depth is a tapped opening 17 into which the correspondingly threaded tubular connection 18 of a pressure gauge 19 is adapted to be screwed. Formed around the barrel 10 adjacent its lower extremity is an annular recess 20 having a snap ring 21 therein which projects outwardly somewhat therefrom immediately adjacent the lower side 4 of the projection 2, and prevents upward movement of the barrel in the aperture 3.

A vertical threaded opening 25 is formed in the barrel 10 for a short distance from its lower extremity, and projecting upwardly therefrom coaxial therewith and with the tapped opening 17 is a smaller aperture 26 of uniform diameter in which adjacent its upper extremity a radial passage 27 from the groove 11 terminates. Formed through the barrel 10 coaxial with and connecting the opening 17 with the aperture 26 is a small conduit 28. A valve stem 29 is threaded for a short distance from adjacent its lower extremity for engagement with the threaded opening 25 and has a needle valve 30 at its upper extremity which is adapted to seat against the lower face of the conduit 28. Above its threaded portion the valve stem 29 is of a somewhat smaller diameter, and adjacent the needle valve vertically spaced O-rings 31 are mounted in annular grooves 32 formed in the said stem to prevent the escape of fluid under pressure through the lower extremity of the opening 25.

The lower extremity of the valve stem 29 is non-circular to receive a disc 34 having a corresponding non-circular opening formed therethrough so that they rotate together; and projecting substantially radially from the disc is a stop 35. 36 denotes a knob having a circular opening therethrough through which the lower extremity of the valve stem 29 projects; and formed around the outer periphery of the stem adjacent its underside are horizontally aligned arcuate grooves 37 which support a snap ring 38 by which the knob is held against downward movement and disengagement from the stem. The disc 34 is supported by the upper face of the knob. Projecting upwardly from the periphery of the knob 36 is an annular wall 39 which encircles the disc 34 and formed through the said wall is a radial opening 40 through which the stop 35 projects, so that as the knob is rotated the disc 34 is turned and therefore the valve stem 29 also. Depending from the underside of the barrel farther from the axis of the latter than the annular wall 39 is a lug 41. The disc 34 is so positioned on the valve stem that when the needle valve 30 is in engagement with its seat the stop 35 is angularly spaced from the lug 41 (Figure 3) and when the valve has been opened the desired amount the stop 35 is in contact with the lug (Figure 5). Thus the amount of opening of the needle valve is limited by the angular distance through which the stop is turned before it strikes the lug 41. Obviously this angular distance may be changed by removing, turning and replacing the disc 34 on the valve stem. For instance by turning the disc 34 upside down, the angular distance of the stop 35 from the lug when the valve is closed may be changed from its position shown in Figure 3 to that indicated at 35a in the same view.

While in the foregoing the preferred embodiment of the invention has been described and shown, it is understood that alterations and modifications may be made thereto, provided the said alterations and modifications fall within the scope of the appended claim.

What I claim is:

A valve mechanism including a rotary body having openings extending thereinto from opposite extremities and a smaller conduit connecting the inner extremities of said openings to one another, a member in which said body is rotatably mounted, said body also having a passage extending laterally therethrough from one of said openings adjacent the conduit, a groove in the outer periphery of said body and with which said passage communicates, the opening from which the passage extends being internally threaded from its outer extremity, a valve stem in threaded engagement therewith and having a valve on its inner extremity to seat against said conduit and prevent a flow of liquid from the lateral passage through the conduit, the outer extremity of the valve stem projecting beyond said body and being of non-circular cross section, a disc having a non-circular opening therethrough mounted on the stem for rotation therewith, said disc also having a stop projecting laterally therefrom, a knob rotatable on the outer extremity of the stem and having an annular wall surrounding said disc and projecting towards the body around the valve stem, said wall having a radial opening therethrough for the passage of the stop therethrough whereby upon rotation of the knob the disc and valve stem are turned, a lug projecting from the body to engage the stop and limit rotation of the valve stem to open the valve, detachable means on the valve stem engageable with said knob for retaining the knob and disc thereon, and the non-circular opening and the stop being relatively so positioned on the disc that after removal of the knob and disc they may be replaced on the valve stem in another relative position so that the stem is rotatable through a predetermined greater angular distance to open the valve before the stop engages the lug.

References Cited in the file of this patent

UNITED STATES PATENTS

| | | |
|---|---|---|
| 323,992 | Wilcox | Aug. 11, 1885 |
| 1,246,389 | Buelna | Nov. 13, 1917 |
| 1,810,202 | Cheetham | June 16, 1931 |
| 2,657,006 | Drow | Oct. 27, 1953 |
| 2,732,169 | Matteo | Jan. 24, 1956 |

FOREIGN PATENTS

| | | |
|---|---|---|
| 51,325 | Switzerland | Mar. 4, 1910 |
| 620,642 | France | Jan. 22, 1927 |